(12) United States Patent
Boozer

(10) Patent No.: US 11,033,153 B2
(45) Date of Patent: Jun. 15, 2021

(54) DRIVE COUPLER FOR BLENDER

(71) Applicant: Vita-Mix Management Corporation, Olmsted Township, OH (US)

(72) Inventor: Richard D. Boozer, Wakeman, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 0 days.

(21) Appl. No.: 15/619,652

(22) Filed: Jun. 12, 2017

(65) Prior Publication Data

US 2018/0042427 A1    Feb. 15, 2018

Related U.S. Application Data

(60) Provisional application No. 62/348,313, filed on Jun. 10, 2016.

(51) Int. Cl.
*A47J 43/08* (2006.01)

(52) U.S. Cl.
CPC .................................. *A47J 43/085* (2013.01)

(58) Field of Classification Search
CPC .... A47J 43/085; F16D 2001/103; F16D 1/10; B01F 15/00675; B01F 15/00681; B01F 2015/00649; B01F 15/0048
See application file for complete search history.

(56) References Cited

U.S. PATENT DOCUMENTS

| | | | |
|---|---|---|---|
| 298,503 A | 5/1884 | Rex | |
| 460,265 A | 9/1891 | Mulford | |
| 747,249 A | 12/1903 | Smith | |
| 2,282,866 A | 5/1942 | Hagan | |
| 2,345,749 A | 4/1944 | Hohwart | |
| 2,370,725 A | 3/1945 | Gordon | |
| 2,639,904 A | 5/1953 | McMaster et al. | |
| 2,670,227 A | 2/1954 | Green | |
| 2,676,506 A | 4/1954 | Schultz | |
| 2,716,564 A | 8/1955 | Lofqvist | |
| 2,722,114 A * | 11/1955 | Kochner | A47J 43/046 366/205 |
| 2,788,038 A | 4/1957 | Corcoran | |
| 3,175,594 A | 3/1965 | Jepson et al. | |
| 3,233,497 A | 2/1966 | McCormick | |

(Continued)

FOREIGN PATENT DOCUMENTS

| | | |
|---|---|---|
| CN | 101904700 | 12/2010 |
| EP | 0041082 | 5/1980 |

(Continued)

OTHER PUBLICATIONS

Young, Lee W., International Search Report, PCT/US2014/29446, dated Aug. 5, 2014, International Search Authority/US.

(Continued)

*Primary Examiner* — Elizabeth Insler

(74) *Attorney, Agent, or Firm* — McDonald Hopkins LLC

(57) ABSTRACT

A drive coupling for a blending system is attachable to a drive shaft of a motor. Rotation of the drive shaft rotates the drive coupling. The drive coupling includes a drive socket that receives a shaft of a blade assembly, and an elastomeric insert disposed between the drive socket and the drive shaft of the motor. The elastomeric insert absorbs vibrations.

18 Claims, 8 Drawing Sheets

(56) References Cited

U.S. PATENT DOCUMENTS

| | | |
|---|---|---|
| 3,368,800 A | 2/1968 | Barnard |
| 3,388,934 A | 6/1968 | Chapman, Jr. et al. |
| 3,543,605 A | 12/1970 | Sherman |
| 3,884,423 A | 5/1975 | Wilson |
| D242,208 S | 11/1976 | Madl et al. |
| 4,087,053 A | 5/1978 | Voglesonger |
| 4,256,010 A | 3/1981 | Petrie |
| 4,264,216 A | 4/1981 | Stansbury, Jr. |
| 4,335,860 A | 6/1982 | Grandel et al. |
| 4,462,694 A | 7/1984 | Emster et al. |
| 4,471,915 A | 9/1984 | Levin et al. |
| 4,678,881 A | 7/1987 | Griffith |
| 4,741,482 A | 5/1988 | Coggiola et al. |
| 4,750,878 A | 6/1988 | Nix et al. |
| 4,783,173 A | 11/1988 | Artin |
| 4,885,917 A | 12/1989 | Spector |
| 4,889,248 A | 12/1989 | Bennett |
| 4,913,555 A | 4/1990 | Maeda et al. |
| 4,993,840 A | 2/1991 | Maeda et al. |
| 5,131,785 A | 7/1992 | Shimazaki |
| 5,273,358 A | 12/1993 | Byrne et al. |
| 5,274,207 A | 12/1993 | Griffith |
| 5,365,807 A | 11/1994 | Darrah et al. |
| 5,368,384 A | 11/1994 | Duncan et al. |
| 5,478,149 A | 12/1995 | Quigg |
| 5,567,049 A | 10/1996 | Beaudet et al. |
| 5,674,026 A | 10/1997 | Ishibashi et al. |
| 5,852,968 A | 12/1998 | Sundquist |
| 5,855,431 A | 1/1999 | Costanzo |
| 6,095,677 A | 8/2000 | Karkos, Jr. et al. |
| 6,149,035 A | 11/2000 | Gorski et al. |
| 6,210,033 B1 | 4/2001 | Karkos, Jr. et al. |
| 6,318,247 B1 | 11/2001 | Di Nunzio et al. |
| 6,325,312 B1 | 12/2001 | Karkos, Jr. |
| 6,336,603 B1 | 1/2002 | Karkos, Jr. et al. |
| 6,416,215 B1 | 7/2002 | Terentiev |
| 6,460,368 B1 | 10/2002 | Grande Damaso |
| 6,494,390 B1 | 12/2002 | Khait et al. |
| 6,513,966 B1 | 2/2003 | Gort-Barton et al. |
| 6,540,394 B2 | 4/2003 | Juriga |
| 6,568,843 B1 | 5/2003 | Lai |
| D480,915 S | 10/2003 | Kolar et al. |
| 6,629,492 B1 | 10/2003 | Li |
| 6,632,013 B2 | 10/2003 | Wulf et al. |
| 6,637,681 B1 | 10/2003 | Planca et al. |
| 6,712,497 B2 | 3/2004 | Jersey et al. |
| 6,758,593 B1 | 7/2004 | Terentiev |
| 6,793,167 B2 | 9/2004 | Karkos, Jr. et al. |
| 6,834,818 B2 | 12/2004 | Lee |
| 6,899,454 B2 | 5/2005 | Terentiev |
| 6,910,800 B2 | 6/2005 | Wu |
| D526,531 S | 8/2006 | Drees |
| D533,395 S | 12/2006 | Drees |
| 7,235,339 B2 | 6/2007 | Casalmir et al. |
| 7,270,156 B2 | 9/2007 | Beesley et al. |
| D552,419 S | 10/2007 | Picozza |
| 7,278,598 B2 | 10/2007 | Katz et al. |
| 7,314,307 B2 | 1/2008 | Cai |
| 7,318,666 B1 | 1/2008 | Lin |
| 7,387,269 B2 | 6/2008 | Mally |
| 7,407,320 B1 | 8/2008 | Lin |
| D577,537 S | 9/2008 | Lee |
| D587,526 S | 3/2009 | Barnard et al. |
| D588,406 S | 3/2009 | Ulanski et al. |
| 7,507,049 B2 | 3/2009 | Eidam et al. |
| 7,530,510 B2 | 5/2009 | Newman et al. |
| 7,552,885 B2 | 6/2009 | Katz et al. |
| 7,566,186 B2 | 7/2009 | Katz et al. |
| D605,462 S | 12/2009 | Picozza |
| 7,641,380 B2 | 1/2010 | Behar et al. |
| D617,145 S | 6/2010 | Picozza |
| D621,656 S | 8/2010 | Ulanski et al. |
| 7,871,196 B2 | 1/2011 | Lin |
| 7,905,728 B2 | 3/2011 | Piontek |
| D642,857 S | 8/2011 | Bodum |
| D644,480 S | 9/2011 | Czach |
| 8,087,818 B2 | 1/2012 | Drees |
| D660,642 S | 5/2012 | Boozer |
| 8,186,872 B2 | 5/2012 | Bartholomew et al. |
| D662,359 S | 6/2012 | Boozer et al. |
| 8,220,730 B2 | 7/2012 | Ferraby et al. |
| 8,226,021 B2 | 7/2012 | Wilson |
| 8,230,774 B1 | 7/2012 | Hunte |
| 8,240,909 B2 | 8/2012 | Athey et al. |
| D667,259 S | 9/2012 | Lee |
| D667,260 S | 9/2012 | Lee |
| D667,261 S | 9/2012 | Lee |
| D668,100 S | 10/2012 | Palermo |
| 8,282,268 B2 | 10/2012 | Karkos, Jr. et al. |
| 8,360,480 B2 | 1/2013 | Athey et al. |
| 8,376,253 B2 | 2/2013 | Oblak et al. |
| D677,976 S | 3/2013 | Palermo |
| D678,727 S | 3/2013 | Kolar et al. |
| 8,403,555 B2 | 3/2013 | Wu |
| 8,403,556 B2 | 3/2013 | Wu |
| 8,444,076 B2 | 5/2013 | Rukavina |
| 8,480,292 B2 | 7/2013 | Dushine et al. |
| D690,152 S | 9/2013 | Palermo |
| 8,529,120 B2 | 9/2013 | Ulanski et al. |
| 8,550,388 B2 | 10/2013 | Donaldson et al. |
| D694,573 S | 12/2013 | Norland |
| 8,621,990 B2 | 1/2014 | Fang et al. |
| D702,078 S | 4/2014 | Coakley |
| 8,690,093 B2 | 4/2014 | Rukavina et al. |
| 8,702,300 B2 | 4/2014 | Audette |
| D711,688 S | 8/2014 | Prats |
| 8,814,011 B2 | 8/2014 | Ulanski et al. |
| 8,814,072 B2 | 8/2014 | Gushwa |
| D730,682 S | 6/2015 | Tu |
| D733,488 S | 7/2015 | Tu |
| D755,003 S | 5/2016 | Palermo |
| D765,462 S | 9/2016 | Davies |
| D765,465 S | 9/2016 | Du |
| D771,999 S | 11/2016 | Kettavong |
| 9,500,235 B2 | 11/2016 | Kanning et al. |
| D797,496 S | 9/2017 | Gee et al. |
| 2002/0071340 A1 | 6/2002 | Juriga |
| 2003/0198127 A1 | 10/2003 | Kumar et al. |
| 2004/0206837 A1 | 10/2004 | Lee |
| 2005/0174882 A1 | 8/2005 | Krasne et al. |
| 2006/0176765 A1 | 8/2006 | Pryor, Jr. et al. |
| 2006/0275075 A1 | 12/2006 | Katz et al. |
| 2006/0286255 A1 | 12/2006 | Xu et al. |
| 2008/0037360 A1 | 2/2008 | McGill |
| 2008/0089170 A1 | 4/2008 | Larson et al. |
| 2008/0098905 A1 | 5/2008 | Steiner et al. |
| 2008/0198688 A1 | 8/2008 | Peng |
| 2008/0264927 A1 | 10/2008 | Peng |
| 2009/0084274 A1 | 4/2009 | Kovacic et al. |
| 2009/0186139 A1 | 7/2009 | Dragan |
| 2009/0260523 A1 | 10/2009 | Peng |
| 2010/0018982 A1 | 1/2010 | Liu |
| 2010/0044303 A1 | 2/2010 | Perrault et al. |
| 2010/0046323 A1 | 2/2010 | Tien et al. |
| 2011/0186172 A1 | 8/2011 | Herbert |
| 2011/0232506 A1 | 9/2011 | Cai |
| 2011/0241503 A1 | 10/2011 | Simon |
| 2012/0206995 A1 | 8/2012 | Wu |
| 2012/0294109 A1 | 11/2012 | Boozer |
| 2013/0028044 A1 | 1/2013 | Karkos, Jr. et al. |
| 2013/0043337 A1 | 2/2013 | Rukavina et al. |
| 2013/0319034 A1 | 12/2013 | Kounlavong et al. |
| 2013/0344204 A1 | 12/2013 | Goodson |
| 2014/0212566 A1 | 7/2014 | Herbert et al. |
| 2014/0270929 A1* | 9/2014 | Kanning ............... F16D 1/10 403/328 |
| 2015/0265983 A1 | 9/2015 | Fleming et al. |

FOREIGN PATENT DOCUMENTS

| | | |
|---|---|---|
| EP | 0754602 | 1/1997 |
| EP | 1688046 | 8/2006 |
| EP | 2210542 | 2/2013 |
| JP | 1152984 | 8/2001 |

(56) References Cited

FOREIGN PATENT DOCUMENTS

| | | |
|---|---|---|
| JP | 1194564 | 3/2003 |
| JP | 1265915 | 7/2005 |
| JP | 1305797 | 6/2006 |
| JP | 1372467 | 11/2008 |
| JP | 1372920 | 11/2008 |
| JP | 1372466 | 12/2008 |
| JP | 1373902 | 4/2009 |
| JP | 1494697 | 9/2013 |
| WO | 2011/113083 | 9/2011 |
| WO | 2012044306 | 4/2012 |
| WO | 2014/008926 | 1/2014 |
| WO | 2014/009339 | 1/2014 |
| WO | 2014/121838 | 8/2014 |
| WO | 2014/122260 | 8/2014 |
| WO | 2014122254 | 8/2014 |

OTHER PUBLICATIONS

Copenheaver, Blaine, International Search Report and Written Opinion, PCT/US2014/027819, dated Jul. 30, 2014, International Search Authority/USA.

* cited by examiner

DRIVE COUPLER FOR BLENDER

CROSS-REFERENCE TO RELATED APPLICATIONS

This application claims priority to U.S. Provisional Patent Application No. 62/348,313 entitled "DRIVE COUPLER FOR BLENDER," filed on Jun. 10, 2016, which is incorporated herein by reference in its entirety.

FIELD OF THE INVENTION

The present invention is generally related to a drive socket and, more particularly, to a drive socket for a blender system.

BACKGROUND

Blenders and blending systems are often used to blend and process foodstuffs. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains or juice bars, and may be made with commercial or restaurant-grade blender. Such drinks also may be made at home, using a personal blender.

Blenders traditionally include a blade assembly attached with a container. The blade assembly of these blenders often requires complex geometries or specific geometries to assist in mixing the contents in the container appropriately. The blade assemblies are driven by a motor to rotate blades of the assembly. Rotation of the blades allow for blending of foodstuff and may produce noise. Noise may be due to vibrations created by the operating motor, and vibrations made by other components of the blender.

Various methods are known to reduce the sound created by a blender. One such method includes providing an enclosure around the container of the blender to contain the noise. These enclosures can also increase the size of the blenders. Therefore, a need exists for an improved means for blending contents. Further, there is a need for reducing noise and vibrations during blending of foodstuff.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

The present teachings relate to a drive coupler assembly for a blender system. The drive coupler includes a drive socket that may receive a shaft of a blade assembly, and an elastomeric material that may be disposed between the drive socket and a drive shaft of a motor. The elastomeric insert may absorb and reduce vibrations between the drive shaft and the blade assembly.

A blending system includes a blender base. The blender base includes a motor having a drive shaft. The drive shaft may be operatively coupled to a drive coupler. The drive coupler may include a drive socket and an insert that may comprise an elastomeric material. The elastomeric material isolates the drive socket from the drive shaft.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout.

DETAILED DESCRIPTION

Figure 1:
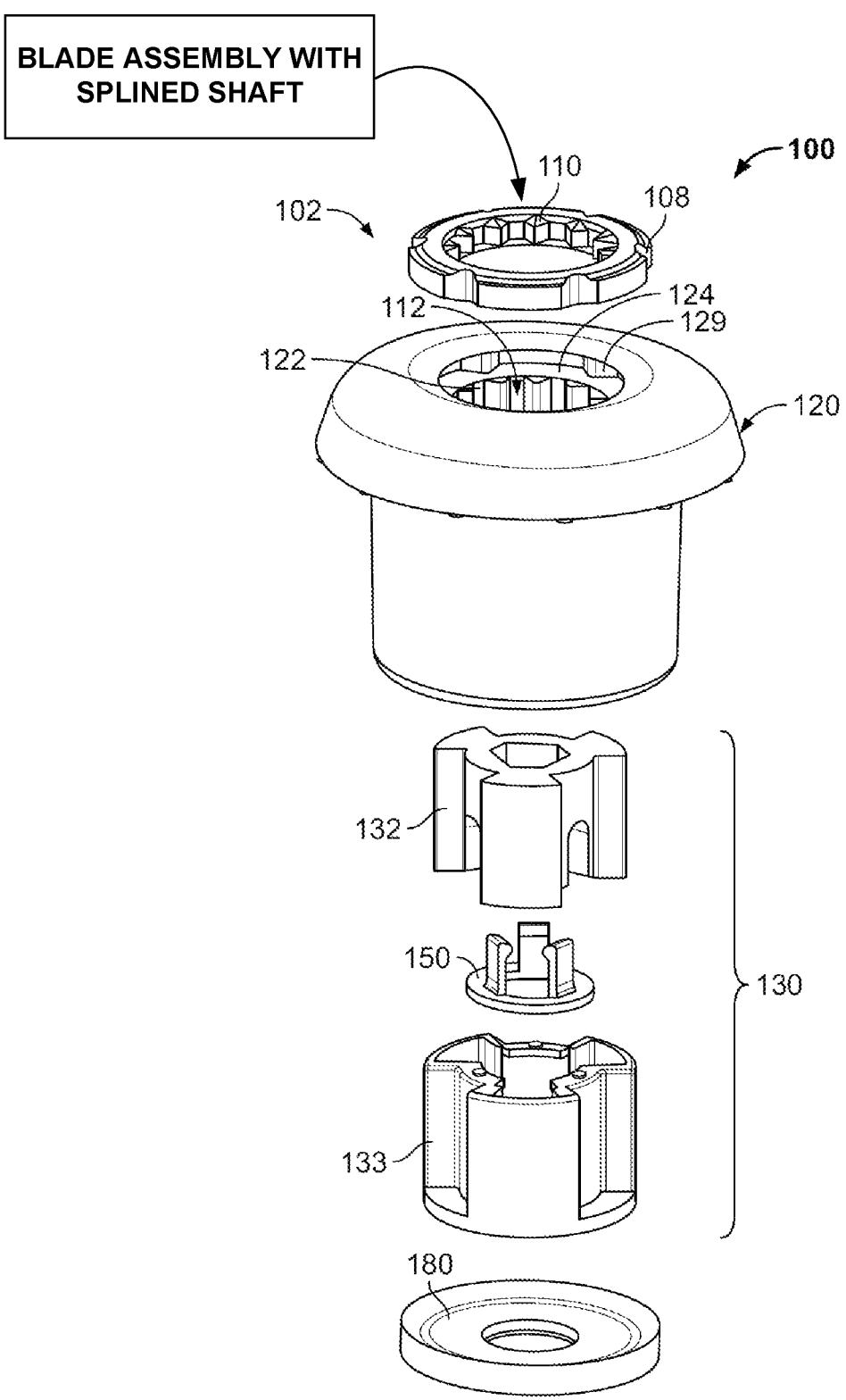
FIG. 1 is an exploded view of a drive coupler of a blending system, in accordance with various disclosed aspects.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

It is noted that the various embodiments described herein may include other components and/or functionality. It is further noted that while various embodiments refer to a blender or a blending system, various other systems may be utilized in view of embodiments described herein. For example, embodiments may be utilized in food processor systems, mixing systems, hand-held blending systems, various other food preparation systems, and the like. As such, references to a blender, blending system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may removably or irremovably attach. The blending container may be powered in any appropriate manner, such as disclosed in U.S. patent application Ser. No. 14/213,557, entitled Powered Blending Container, which is hereby incorporated by reference. Foodstuff may be added to the blending container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the likes. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the likes. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

In some traditional blending devices, rotation of blades in a container may produce a large amount of noise that may be unpleasant for a user. For instance, blade assemblies and/or blending containers of the blending devices may vibrate during operation, which may contribute to such noise. The vibration and noise may increase at high speeds or blending of particular ingredients. In another aspect, molding of thick sections or parts for a blade assembly may provide challenges. In some blending devices, a spring clip within a drive coupler is sometimes used to prevent a drive shaft from disengaging the coupler in the axial direction. The force exerted by a spring clip, however, may cause misalignment between the drive shaft and a blade assembly shaft. That misalignment may cause increased noise and/or reduce efficiency.

In embodiments, a blender assembly may include a blender base housing a motor. The motor may include a drive shaft that operatively drives an attachable blade assembly. In an aspect, the drive shaft may include a drive coupler that may be attached (e.g., removably or irremovably) from the drive shaft. The drive coupler may comprise a chamber that may receive a drive shaft of a blade assembly. The motor may rotate the drive shaft to drive the blade assembly.

As disclosed in the various described embodiments, a drive coupler assembly may be operatively attached to a drive shaft of a blending system. The drive coupler may comprise a drive socket that operatively receives a drive shaft of a blade assembly, and an elastomeric insert disposed between the drive socket and the drive shaft of the motor. The elastomeric insert may comprise an elastomeric material, including, without limitation, a rubber. It is noted that the elastomeric insert may be under compression within the drive socket. The compression may stiffen the elastomeric insert, such that the elastomeric insert is radially and axially rigid. In an aspect, the dampening member may maintain sound and/or vibration dampening properties while providing a stiffened coupler. While rubber and plastic are identified herein as potential elastomeric materials, the present teachings may include any kind of elastomeric material, including, without limitation, rubber, plastic (e.g., thermoplastic vulcanizate or other thermoplastic elastomers), a combination of rubber and plastic, a foam material, a compressed foam material, and any combination of such.

In an aspect, the elastomeric insert may isolate or absorb vibrations. This may reduce vibrations between the drive shaft and the drive socket—and other portions of a blending system, such as a container and blade assembly. The reduced vibrations may generally reduce noise produced from operation of the blender system. It is noted that described drive coupler assemblies may provide other or different advantages that may be apparent throughout.

FIG. 1 illustrates a drive coupler 100 for a blender system, in accordance with various described embodiments. The blender system may include additional or other components not shown for brevity, such as a container, blender base, a blade assembly, etc. For example, the blender system may include a blender base that houses a motor. The motor may include a drive shaft and the drive coupler 100 may be attachable (e.g., irremovably or removably) to the drive shaft. It is noted that while components of the drive coupler 100 are described as separate components, various components may be monolithically formed.

The drive coupler 100 may primarily comprise a ring insert 102, a drive socket 120 that may receive the ring insert 102, a drive insert 130 (which may include a second insert 132, a clip 150, and a first insert 133), and a cap 180. The components of the drive coupler 100 may be preassembled and/or may be assembled at a factory or by an end user. In an example, the drive insert 130 may be preassembled by a manufacturer or a supplier.

Figure 2:
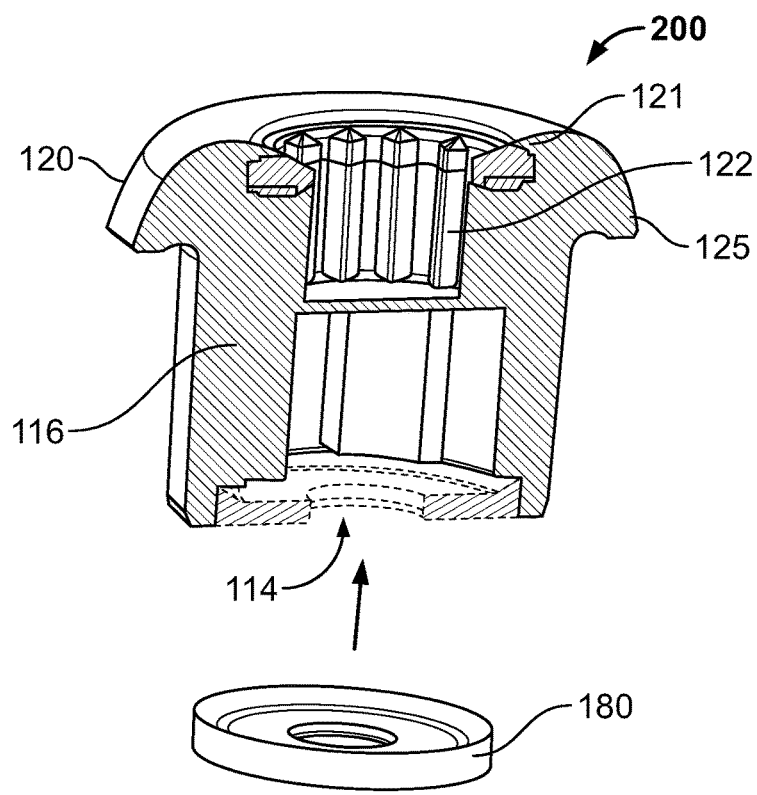
FIG. 2 is a partial, cross-sectional view of a drive socket and a cap of the drive coupler of FIG. 1, in accordance with various disclosed aspects.
Figure 3:
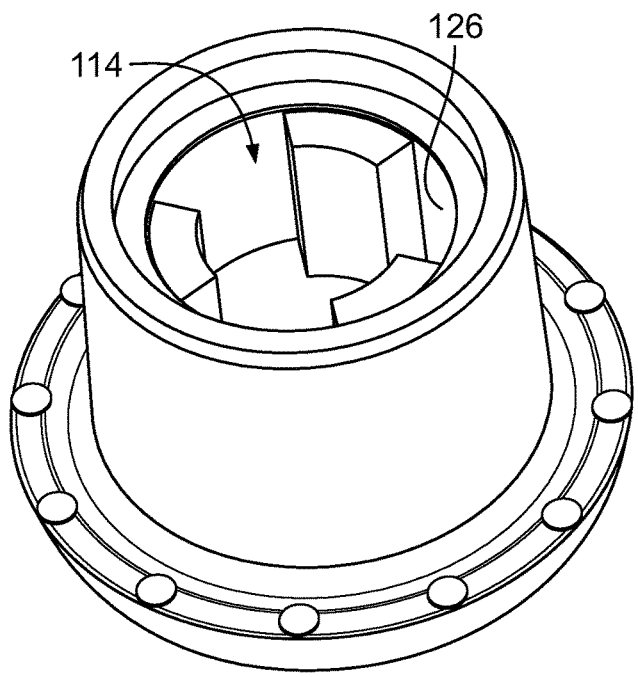
FIG. 3 is a bottom, perspective view of a drive socket of FIG. 1, in accordance with various disclosed aspects.
Figure 4:
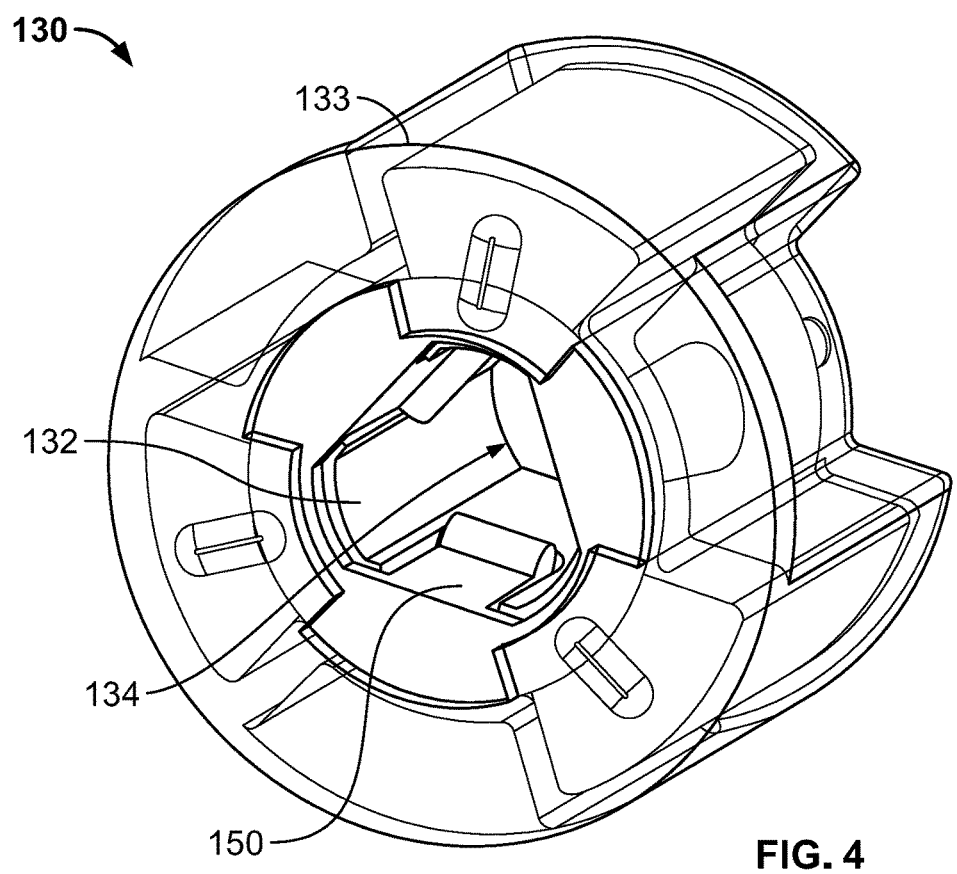
FIG. 4 is a partial, transparent view of a drive insert of the drive coupler of FIG. 1, in accordance with various disclosed aspects.
Figure 5:
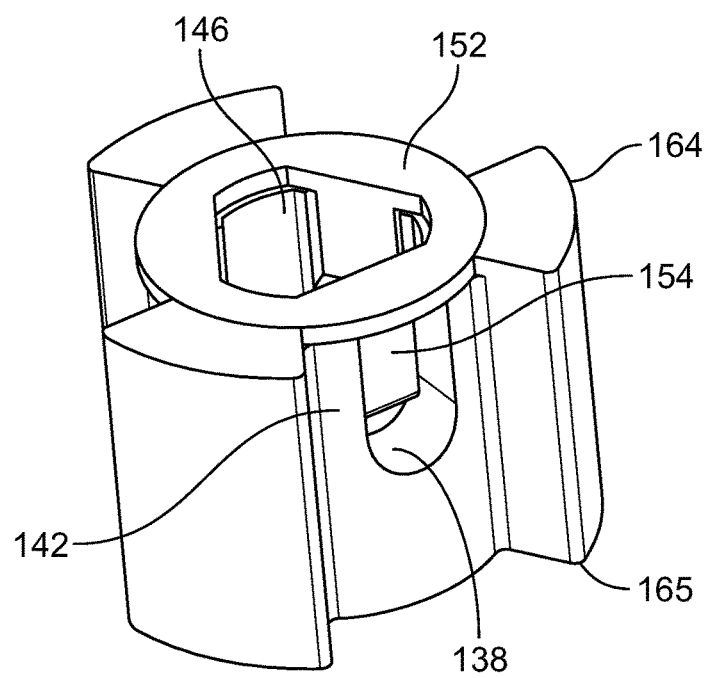
FIG. 5 is a perspective view of a second insert assembled with a clip of the drive coupler of FIG. 1, in accordance with various disclosed aspects.
Figure 6:
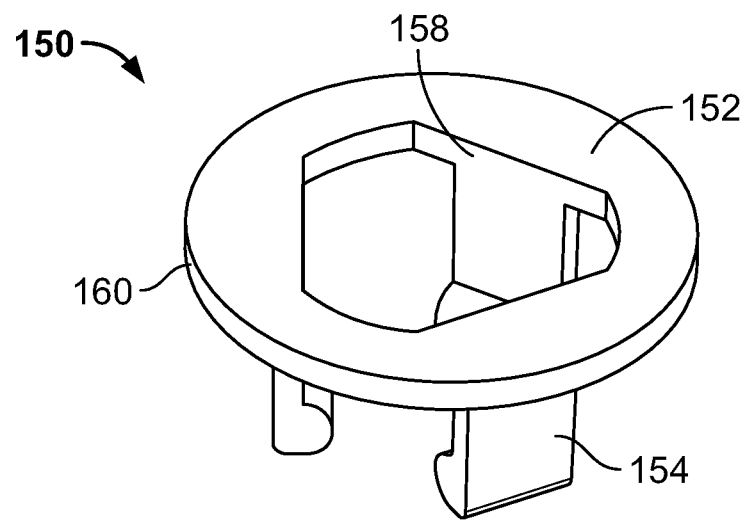
FIG. 6 is a top, perspective view of a clip of the drive coupler of FIG. 1, in accordance with various disclosed aspects.
Figure 7:
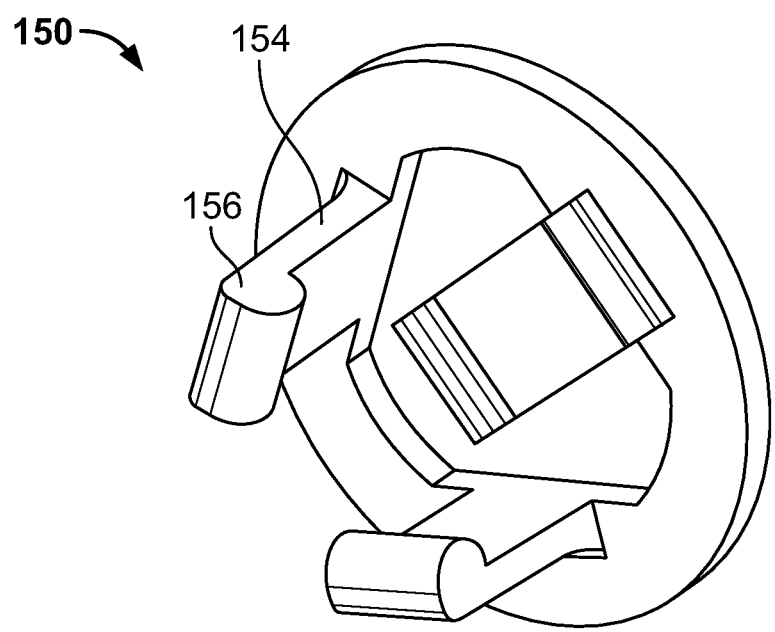
FIG. 7 is a bottom, perspective view of a clip of the drive coupler of FIG. 1, in accordance with various disclosed aspects.
Figure 8:
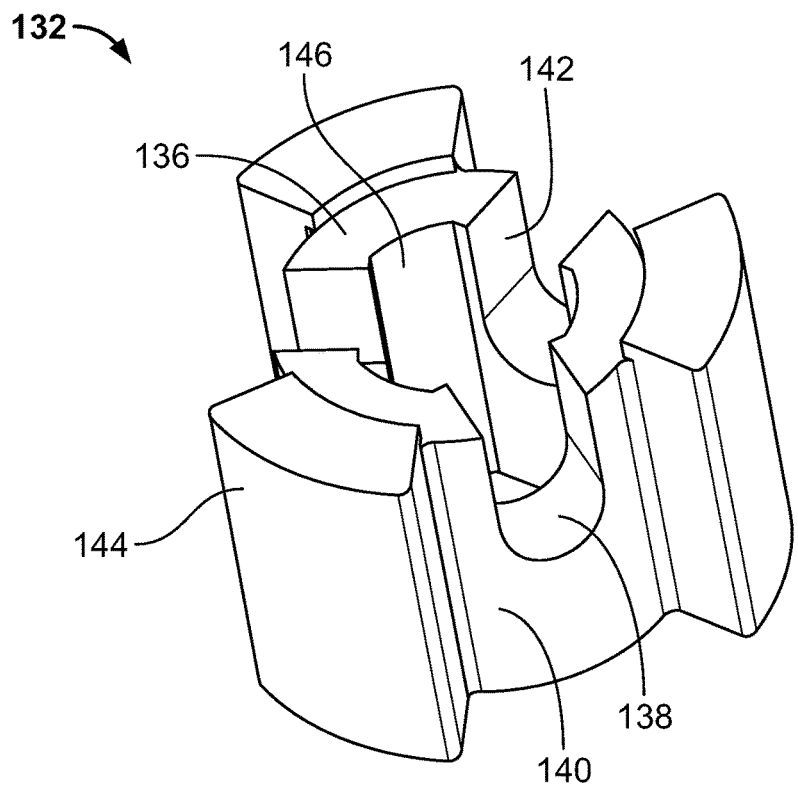
FIG. 8 is a top, perspective view of a second insert of the drive coupler of FIG. 1, in accordance with various disclosed aspects.
Figure 9:
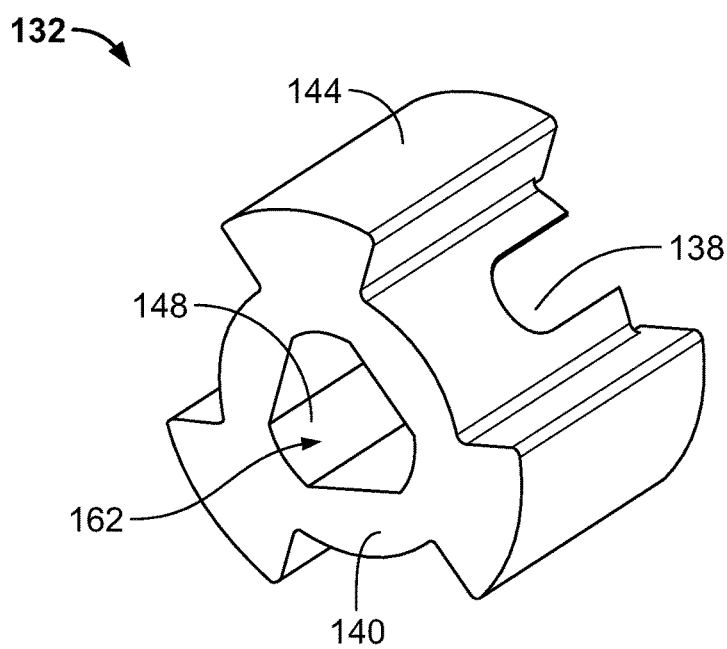
FIG. 9 is a bottom, perspective view of a second insert of the drive coupler of FIG. 1, in accordance with various disclosed aspects.
Figure 10:
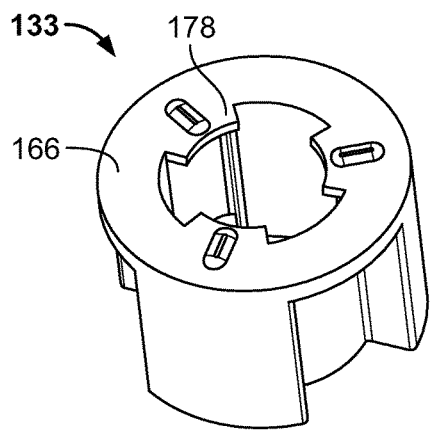
FIG. 10 is a top, perspective view of a first insert of the drive coupler of FIG. 1, in accordance with various disclosed aspects.
Figure 11:
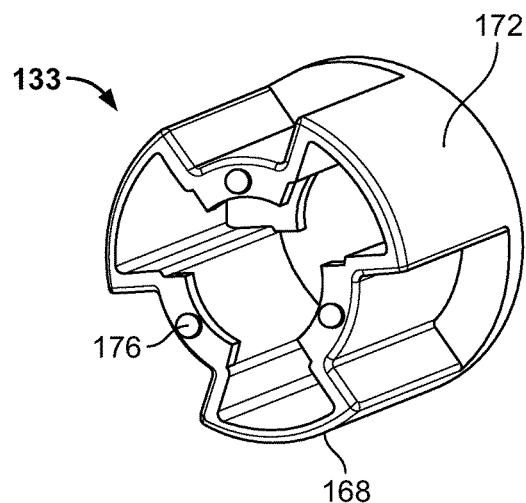
FIG. 11 is a bottom, perspective view of a first insert of the drive coupler of FIG. 1, in accordance with various disclosed aspects.
Figure 12:
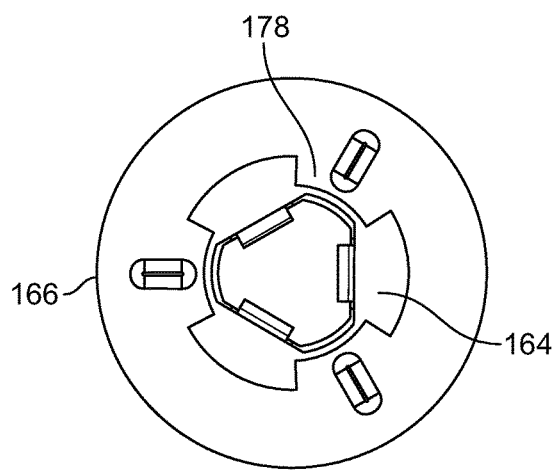
FIG. 12 is a top, perspective view of a drive insert of the drive coupler of FIG. 1, in accordance with various disclosed aspects.
Figure 13:
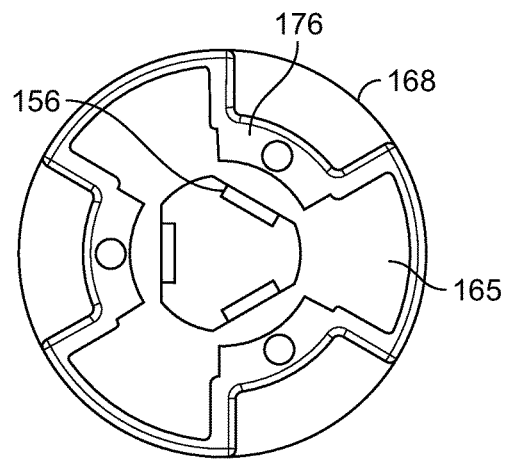
FIG. 13 is a bottom, perspective view of a drive insert of the drive coupler of FIG. 1, in accordance with various disclosed aspects.

Turning now to FIGS. 2 and 3, with reference to FIG. 1, illustrated is a partial cross-sectional view 200 of the drive socket 120 and the cap 180, and a bottom perspective view of the drive socket 120. Drive socket 120 may include the body 116 that may comprise one or more chambers, such as splined chamber 112 and drive chamber 114. The splined chamber 112 may include one or more splines 122, threads, or other mechanisms for receiving a shaft of a blade assembly. In another aspect, the splined chamber 112 may include a ring receiving portion 124 (as shown in FIG. 1) that may be sized and shaped to receive the ring insert 102. It is noted that the ring receiving portion 124 may comprise one or more geometric features, magnets, or other components that may allow splines 110 of ring insert 102 to align with splines 122 of the splined chamber 112. For instance, the ring insert 102 may include one or more notches 108 sized and shaped to receive one or more protrusions 129 (as shown in FIG. 1) within the ring receiving portion 124. For example, the ring insert 102 may include i notches 108 disposed along a perimeter of the ring insert 102. The ring receiving portion 124 may include j protrusions 129 sized and shaped to mate with the one or more notches 108, where i and j are numbers. The notches 108 and protrusions 129 may generally prevent the ring insert 102 from rotating with respect to the drive socket 120.

It is noted that the drive socket 120 may include a top portion 125 and the body 116. The top portion 125 and the body 116 may comprise one or more components or pieces that may be joined together or of unitary construction. In at least one example, the top portion 125 may include a flange 121 that may generally retain or secure the ring insert 102 within the ring receiving portion 124. It is noted that the ring insert 102 may be overmolded with the flange 121 or the like. In at least one example, the ring receiving portion 124 may be sealed by the flange 121 and the ring insert 102.

According to at least one embodiment, the ring insert 102 may comprise a metal or other material having properties that prevent the ring insert 102 from deforming due to operation of the blender system. The drive socket 120 may comprise a material that may be more susceptible to deformation, such as plastic, but may be lighter in weight, have vibration absorbing properties, or the like. As such, the ring insert 102 may generally bare the load from torque applied to the blade assembly. It is noted, however, that the ring insert 102 may extend along part or all of the splined chamber 112. In another aspect, the drive socket 120 may comprise a metal material and the drive coupler 100 may not include a ring insert 102.

The drive chamber 114 of the drive socket 120 may be sized and shaped for receiving the drive insert 130. For example, the drive chamber 114 may include one or more geometric formations 126 that may allow the drive insert 130 to mate with the drive chamber 114, such as operatively mating. Such formations 126 may allow the drive insert 130 to rotate the drive socket 120 in response to rotation of the drive shaft of the motor, as described in more detail herein.

In embodiments, the cap 180 may be attached (e.g., removably or irremovably) to the drive socket 120. The cap 180, for instance, may be welded, overmolded, press-fit, or otherwise attached to the drive socket 120 proximal the drive chamber 114. For example, the cap 180 may be welded to the drive socket 120 after the drive insert 130 is disposed within the drive chamber 114. This may prevent (e.g., or reduce the chances of) the drive socket 120 from separating from the drive insert 130.

As shown in FIGS. 4-13, the drive insert 130 may comprise the second insert 132, the clip 150, and the first insert 133. In an aspect, second insert 132 may be sized and shaped to receive the clip 150 and the first insert 133 receive the second insert 132, such that at least a portion of the second insert 132 nests with the first insert 133. It is noted that the components of drive insert 130 may be configured for friction-fit or press-fit. For instance, the first insert 133 may comprise an elastomeric insert that may compress the second insert 132 and the clip 150 when the drive insert 130 is operatively assembled.

Second insert 132 may comprise a metal (e.g., patterned metal, etc.), plastic or the like. The second insert 132 may be formed via molding, 3-D printing, machining, or the like. In an aspect, the second insert 132 may comprise a body 140 having one or more protrusions 142 extending therefrom. Body 140 may extend between a proximal end 164 and distal end 165. One or more slots 138 may be disposed between the one or more protrusions 142. It is noted that while second insert 132 is shown as comprising three protrusions 142 and three slots 138, the second insert 132 may comprise a different number of protrusions 142 or slots 138, and/or no protrusions 142 or slots 138.

According to an embodiment, second insert 132 may include one more teeth 144 extending outwardly from the protrusions 142. As described in more detail herein, the one or more teeth 144 may allow a drive shaft to rotate the drive socket 120 and/or the blade assembly of a blender system. It is noted that the teeth 144 and the protrusions 142 may be sized and shaped to receive the clip 150. For instance, at least a portion of the teeth 144 and the protrusions 142 may form a seat 136 that may be sized and shaped to receive the clip 150. The seat 136 may generally support or contact a portion of the clip 150. For instance, clip 150 may include a ring 152 having an inner perimeter 158 and an outer perimeter 160. The seat 136 may be sized and shaped to receive the ring 152.

In another aspect, the clip 150 may include one or more tabs 154 extending from the ring 152. The tabs 154 may comprise spring clips. For instance, the tabs 154 may comprise a material having spring qualities that bias the tabs 154 towards a particular orientation. Tabs 154 may include one or more cleats 156 extending therefrom. These cleats 156 may couple or mate with grooves of a drive shaft, as described in more detail herein.

In an example, the clip 150 may be paired or otherwise coupled to the second insert 132, such that the ring 152 rests on or abuts the seat 135. The tabs 154 may extend within an aperture 162 of the second insert 132. For instance, the tabs 154 may generally align with the slots 138. This may allow the tabs 154 to maintain some room for flexibility. According to an aspect, the aperture 162 may comprise a perimeter 148 that may comprise one or more sides or corners 146. For instance, the perimeter 148 may comprise a shape representing a triangle with squared off vertices. In an example, rotation of the tabs 154 may cause rotation of the second insert 132 as the tabs 154 may not freely rotate with the aperture 162 because, at least in part, of the corners 146. These and other embodiments may allow for reduction in cost to produce, service, and assemble the drive coupler 100. In another aspect, various embodiments may reduce time need to assemble the drive coupler 100. It is noted, however, that the drive insert 130 may include various other locking mechanisms, such as fasteners, pins, magnets, or the like.

As described herein, the first insert 133 may comprise a sleeve that may receive or surround the assembled clip 150 and second insert 132. According to an illustrative example, the first insert 133 may comprise an elastomeric material, such as a rubber or plastic. First insert 133 may be deformed (e.g., stretched, etc.) to allow the assembled clip 150 and second insert 132 to be inserted therein. In an aspect, the second insert 132 may be held in place via a friction fit, magnet, fastener or the like.

As shown in FIGS. 10-13, the first insert 133 may comprise a proximal end 166 and a distal end 168. A body 172 may extend between the proximal end 166 and the distal end 168. In an aspect, the body 172 may be sized and shaped to generally allow the assembled clip 150 and second insert 132 to nest therein. For instance, the body 172 may comprise an internal perimeter or profile that mirrors the external perimeter or profile of the assembled clip 150 and second insert 132.

In another aspect, the assembled clip 150 and second insert 132 may be inserted at the distal end 168, with a proximal end 164 of the assembled clip 150 and second insert 132 entering the distal end 168 first. That is, when inserted, the proximal end 164 (e.g., the end proximal the ring 152) will abut the proximal end 166 of the first insert 133. In an example, the first insert 133 may include one or more flaps 176 that may be manipulated and/or bent such that the assembled clip 150 and second insert 132 may be inserted in the first insert 133. Once fully inserted, the flaps 176 may be allowed to return substantially to their original position. In another aspect, a second set of flaps 178 at the proximal end 166 may abut the proximal end 164 of the clip 150 and second insert 132. These flaps 176 and/or 178 may generally prevent the clip 150 and second insert 132 from being removed from the first insert 133. It is noted, however, that a user may bend or otherwise reposition the flaps 176 and/or 178 to remove one or more of the clip 150 and second insert 132. In this aspect, portions of the drive coupler 100 may be replaced.

Figure 14:
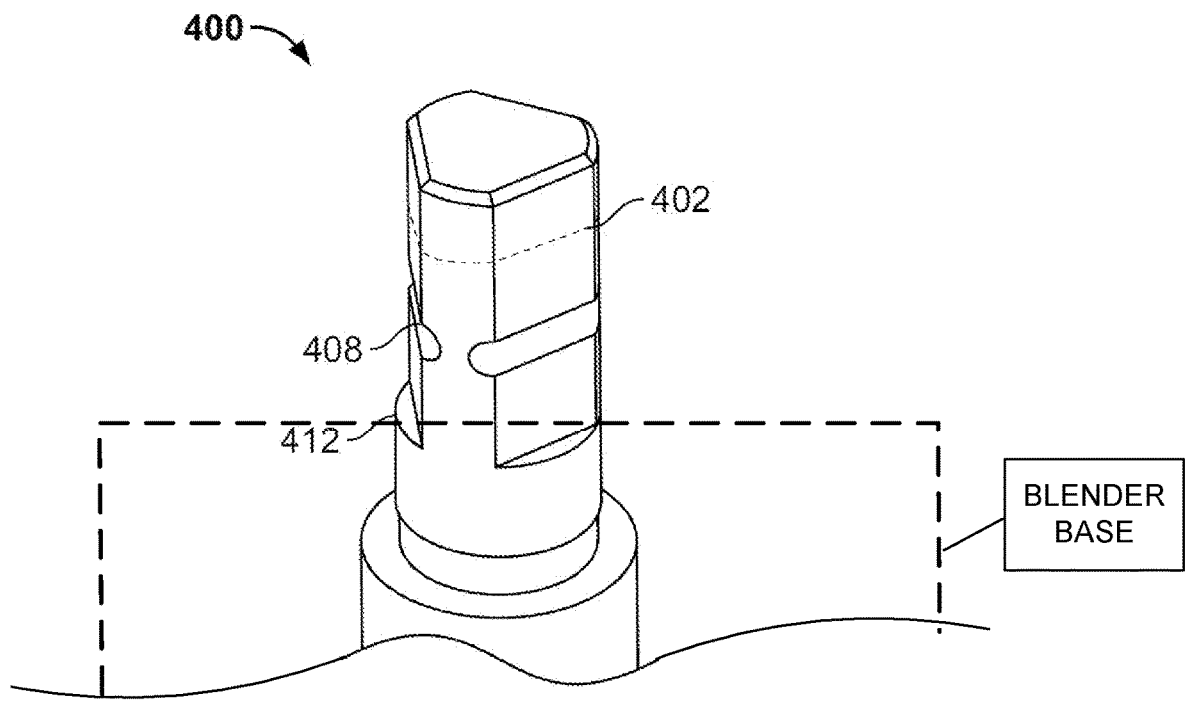
FIG. 14 is a perspective view of a drive shaft of a blender system, in accordance with various disclosed aspects.
Figure 15:
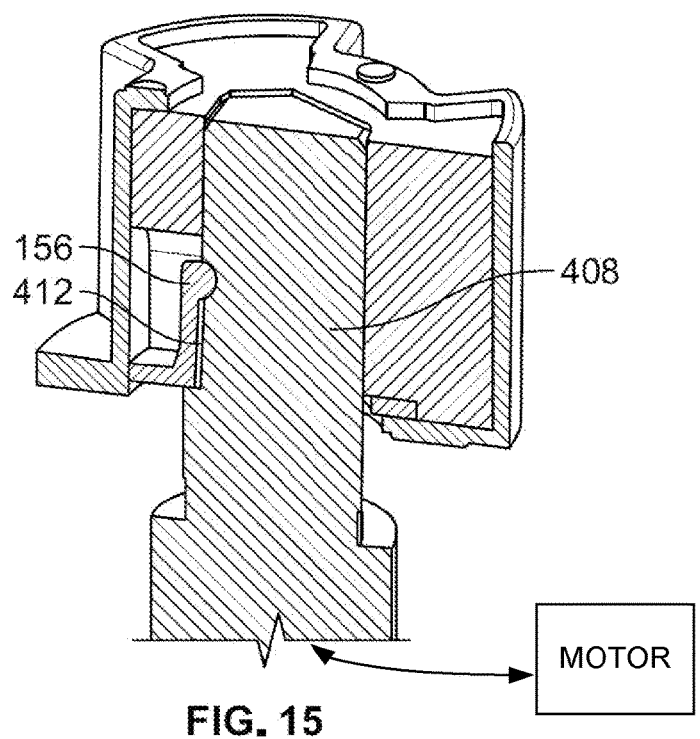
FIG. 15 is a partial, cross-sectional view of a drive shaft and a drive insert of a blender system, in accordance with various disclosed aspects.

Turning now to FIGS. 14 and 15, there is a drive shaft 400 of a blender system that may be coupled with the drive coupler 100 as described herein. The drive shaft 400 may comprise a drive shaft of a blender motor (not shown) that may operatively rotate the drive shaft. In embodiments, the drive shaft 400 may comprise a perimeter 402 that may generally mirror the perimeter of aperture 162 of the drive coupler 100. In an aspect, the perimeter 402 may comprise one or more sides, bends, or other geometric formations.

As shown, the perimeter 402 may comprise a triangular-shape with squared, chamfered, tapered, rounded, or otherwise modified vertices. The triangular-shape may generally allow for operative engagement with the drive coupler 100. The shape, moreover, may be cheaper to produce than square, rectangular, hexagonal, splined or other shaped versions. For instance, the tolerances for the triangular-shape may be greater than those of 4 or more sided polygonal-shapes, splined shapes, or the like. The greater tolerance may allow for more efficient and less costly production while maintaining the ability for drive shaft 400 to operatively couple with the drive coupler 100.

According to various aspects, the drive shaft 400 may include one or more receiving member 408, which may comprise grooves that may mate with cleats 156 of clip 150. For example, when the drive coupler 100 is operatively pressed or otherwise coupled onto the drive shaft 400, the tabs 154 may bend or deform. Once the cleats 156 reach the receiving members 408, the tabs 154 may snap or clip into place. This may prevent the drive coupler 100 from becoming dislodged from the drive shaft 400. In another aspect, the drive shaft 400 may include one or more ledges 412 that may operatively allow a portion of the drive coupler 100 to rest thereon.

As described here and elsewhere in this disclosure, the first insert 133 and the second insert 132 may be disposed between the drive shaft 400 and the drive socket 120. At least one of the first insert 133 and the second insert 132 may comprise an elastomeric material. The elastomeric material may, for example, absorb vibrations, reduce noise, reduce wobble, increase efficiency, or the like. It is noted that the first insert 133 may generally prevent direct contact between the drive socket 120 and the drive shaft 400. In another aspect, the first insert 133 may prevent direct contact between rigid components, such as the second insert 132 and the drive socket 120.

Moreover, while embodiments refer to the first insert 133 and the second insert 132, it is noted that the inserts may comprise a single component. In another aspect, the drive socket 120 may comprise an elastomeric material deposited with the drive chamber 114 via chemical deposition or the like. As such, the drive coupler 100 may not include first insert 133 and/or first insert 133 may be considered as integrally formed with the drive coupler 100.

It is noted that FIGS. 14-15 do not illustrate the drive socket 120, ring insert 102 and/or cap 180 for readability and brevity. In embodiments, the drive insert 130 may be inserted or assembled with such components prior to attaching the drive insert 130 to the drive shaft 400. It is noted, however, that the drive insert 130 may be attached to the drive socket 120 and the like after the drive insert 130 is attached to the drive shaft 400.

It is further noted that various modifications are within the scope and spirit of this disclosure. For instance, a drive coupler may comprise different components, shapes, or the like. In an example, a locking pin may operatively lock the drive socket 120 into place with the drive insert 130. Moreover, drive sockets may or may not be splined. As such, various other mechanisms may be utilized for attaching a blade assembly to a drive coupler. While embodiments have been illustrated as comprising a clip, tabs, or the like, a drive coupler may be attached to a drive shaft by various other methods, such as threaded connections, screws, bolts, rivets, other fasteners, magnetic connections, welding, or the like.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define a blending system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

Figure 16:
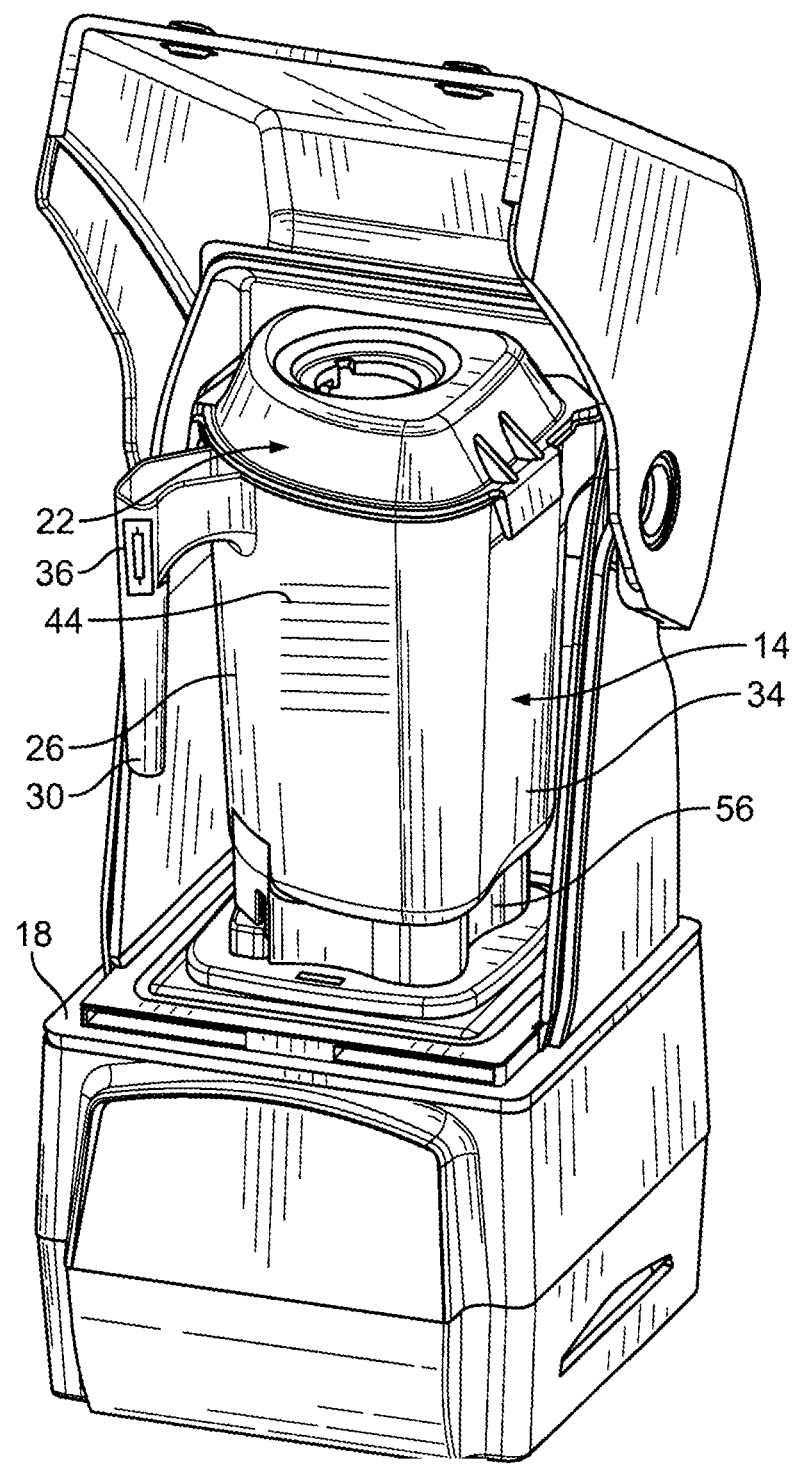
FIG. 16 is a perspective view of a blender base and a blending container, in accordance with various disclosed aspects.

FIG. 16 depicts a blending base 18 and blending container 14 that may be utilized in accordance with disclosed aspects. The container 14 may include a lid 22, a body 26, a handle 30, and a base 34. The blending container 14 may have a power source 36 positioned in the blending container 14 at any appropriate location. A blade assembly 56 may be operatively coupled to the container 14. The blade assembly 56 may include a splined shaft to be driven by the drive coupler 100.

What is claimed is:

1. A blender system comprising:
   a blender base comprising a motor, the motor comprising a drive shaft;
   a drive socket comprising a splined chamber operatively receiving a splined shaft of a blade assembly, and comprising a drive chamber, wherein the drive chamber comprises chamber formations;
   a locking member operatively attachable to the drive shaft; and
   a drive insert operatively disposed within the drive chamber and coupling the drive socket to the drive shaft, the drive insert comprising a first insert,
   wherein the first insert comprises an elastomeric material and is disposed between the drive shaft and the drive socket,
   wherein the drive insert comprises formations that interlock with the drive chamber formations such that rotation of the drive insert rotates the drive socket, and
   wherein the locking member is disposed between the drive shaft and the drive insert such that the locking member does not physically contact the drive chamber, and wherein the drive insert generally prevents direct contact between the drive socket and the drive shaft.

2. The blender system of claim 1, wherein the drive insert further comprises a second insert disposed between the drive shaft and the first insert, and wherein the second insert comprises an elastomeric material.

3. The blender system of claim 2, wherein the first insert comprises a chamber that operatively receives the second insert.

4. The blender system of claim 3, wherein the first insert compresses the second insert.

5. The blender system of claim 2, wherein the first insert comprises at least one flap operatively disposed adjacent a proximal end of the second insert.

6. The blender system of claim 2, wherein the first insert comprises at least one flap operatively disposed adjacent a distal end of the second insert.

7. The blender system of claim 1 wherein the locking member comprises a clip.

8. The blender system of claim 1, wherein the drive socket further includes a ring insert comprising a metallic material.

9. The blender system of claim 1, wherein at least a portion of the drive shaft comprises a triangular-shape.

10. The blender system of claim 1, further comprising a cap operatively welded to the drive socket to secure the first insert within the drive socket.

11. A blender system comprising:
    a blender base comprising a motor,
    wherein the motor comprises a drive shaft;
    a blender container operatively coupled to the blender base and comprising a blade assembly,
    wherein the blade assembly comprises a splined shaft;
    a drive coupler comprising:
        a splined chamber operatively receiving the splined shaft; and
        a drive chamber operatively receiving the drive shaft, wherein the drive chamber comprises at least one drive chamber formation;
    an elastomeric material disposed between the drive chamber and the drive shaft wherein the elastomeric material physically separates the drive shaft and the drive coupler, and
    at least one locking member operatively attached to the drive shaft, wherein the locking member is operatively disposed between the elastomeric material and the drive shaft, such that the locking member is physically separated from the drive chamber, wherein the drive insert comprises at least one formation that interlocks with the at least one drive chamber formation such that rotation of the drive shaft rotates the drive coupler.

12. The blender system of claim 11, wherein the elastomeric material comprises an insert.

13. The blender system of claim 11, wherein the elastomeric material is adhered to the drive chamber.

14. The blender system of claim 11, wherein the elastomeric material operatively absorbs vibrations between the drive shaft and the drive chamber.

15. A drive coupler operatively coupled to a drive shaft of a blender base, the drive coupler comprising:
    a first insert comprising an elastomeric material and a chamber defined by a body, a proximal end, and a distal end;
    a second insert operatively nested within the chamber of the first insert;
    at least one locking mechanism operatively securing the drive coupler to the drive shaft,
    wherein an internal perimeter of the body generally mirrors an external perimeter of at least one of the second insert and the at least one locking mechanism wherein the elastomeric material of the first insert prevents contact between the drive shaft and the drive coupler
    a cap operatively securing the first insert, the second insert and the locking mechanism.

16. The drive coupler of claim 15, wherein the at least one locking mechanism comprises at least one spring clip.

17. The drive coupler of claim 15, further comprising a drive socket operatively receiving the first insert, the second insert, and the locking mechanism.

18. The drive coupler of claim 17, wherein the cap operatively secures the first insert, the second insert, and the locking mechanism within the drive socket.

* * * * *